United States Patent
Jang et al.

(10) Patent No.: US 12,284,564 B2
(45) Date of Patent: Apr. 22, 2025

(54) METHOD AND DEVICE FOR MEASURING BEAM FAILURE DETECTION RESOURCE DURING DISCONTINUOUS RECEPTION SETTING IN WIRELESS COMMUNICATION SYSTEM

(71) Applicant: Samsung Electronics Co., Ltd., Gyeonggi-do (KR)

(72) Inventors: Jaehyuk Jang, Gyeonggi-do (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 349 days.

(21) Appl. No.: 17/791,383

(22) PCT Filed: Jan. 11, 2021

(86) PCT No.: PCT/KR2021/000356
§ 371 (c)(1),
(2) Date: Jul. 7, 2022

(87) PCT Pub. No.: WO2021/141475
PCT Pub. Date: Jul. 15, 2021

(65) Prior Publication Data
US 2023/0038037 A1   Feb. 9, 2023

(30) Foreign Application Priority Data
Jan. 10, 2020 (KR) .................. 10-2020-0003745

(51) Int. Cl.
*H04W 36/30* (2009.01)
*H04W 36/00* (2009.01)
(Continued)

(52) U.S. Cl.
CPC ..... *H04W 36/305* (2018.08); *H04W 36/0085* (2018.08); *H04W 72/23* (2023.01); *H04W 76/28* (2018.02); *H04W 16/28* (2013.01)

(58) Field of Classification Search
CPC .......... H04W 36/305; H04W 36/0085; H04W 72/23; H04W 76/28; H04W 16/28;
(Continued)

(56) References Cited

U.S. PATENT DOCUMENTS

2019/0357292 A1   11/2019 Cirik et al.
2019/0394660 A1   12/2019 He et al.
(Continued)

FOREIGN PATENT DOCUMENTS

KR   10-2019-0101583   9/2019
KR   10-2019-0138873   12/2019
(Continued)

OTHER PUBLICATIONS

PCT/ISA/210 Search Report issued on PCT/KR2021/000356, Apr. 1, 2021 pp. 6.
(Continued)

*Primary Examiner* — Thai Nguyen
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to the disclosure, a terminal reduces the delay required in beam failure detection, and thus recovery can be quick from when beam failure occurs.

14 Claims, 7 Drawing Sheets

(51) Int. Cl.
  *H04W 72/23* (2023.01)
  *H04W 76/28* (2018.01)
  *H04W 16/28* (2009.01)

(58) Field of Classification Search
  CPC ....... H04W 8/24; H04W 76/19; H04W 76/27;
       H04W 24/08; Y02D 30/70
  See application file for complete search history.

(56) References Cited

U.S. PATENT DOCUMENTS

2020/0053824 A1* 2/2020 He .................... H04B 17/309
2020/0059397 A1  2/2020 da Silva et al.

FOREIGN PATENT DOCUMENTS

WO  WO-2014119860 A1 *  8/2014  ............ H04W 24/10
WO  WO-2019032882 A1 *  2/2019  ............ H04B 7/0695
WO  WO 2019/246204        12/2019

OTHER PUBLICATIONS

PCT/ISA/237 Written Opinion issued on PCT/KR2021/000356, Apr. 1, 2021, pp. 4.
Asustek, BFR procedure during DRX mode, R2-1815238, 3GPP TSG RAN WG2 #103b, Chengdu, China, Sep. 28, 2018, pp. 7.
Huawei et al., Beam failure recovery in DRX, R2-1818244, 3GPP TSG RAN WG2 #104, Spokane, USA, Nov. 2, 2018, pp. 5.
3GPP TS 38.133 V15.7.0 (Sep. 2019) 3rd Generation Partnership Project; Technical Specification Group Radio Access Network; NR; Requirements for support of radio resource.

* cited by examiner

METHOD AND DEVICE FOR MEASURING BEAM FAILURE DETECTION RESOURCE DURING DISCONTINUOUS RECEPTION SETTING IN WIRELESS COMMUNICATION SYSTEM

PRIORITY

This application is a National Phase Entry of PCT International Application No. PCT/KR2021/000356, which was filed on Jan. 11, 2021, and claims priority to Korean Patent Application No. 10-2020-0003745, which was filed on Jan. 10, 2020, the entire content of each of which is incorporated herein by reference.

TECHNICAL FIELD

The disclosure relates to a method for a terminal in a connected state to measure a beam failure detection resource in a wireless communication system, and more particularly, in 3GPP 5G new radio (NR) technology.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

When discontinuous reception (DRX or connected-DRX (C-DRX)) is configured in a terminal in a connected state, the need for a method of reducing the delay of beam failure detection has emerged.

DISCLOSURE OF INVENTION

Technical Problem

It is necessary to define a method of reducing the delay of beam failure detection even in case that discontinuous reception (DRX or connected-DRX (C-DRX)) is configured in a terminal in a connected state.

Solution to Problem

According to the disclosure, a method of controlling a terminal in a wireless communication system may include receiving a message including discontinuous reception (DRX) configuration information from a base station; performing beam failure detection (BFD) in at least one resource configured by the base station; identifying whether a preconfigured condition is satisfied; and performing, in case that the preconfigured condition is satisfied, fast BFD that transfers the BFD execution result without considering a DRX cycle included in the DRX configuration information.

According to the disclosure, a terminal in a wireless communication system may include a transceiver; and a controller, wherein the controller is configured to control the transceiver to receive a message including discontinuous reception (DRX) configuration information from a base station, to perform beam failure detection (BFD) in at least one resource configured by the base station, to identify whether a preconfigured condition is satisfied, and to perform fast BFD that transfers the BFD execution result without considering a DRX cycle included in the DRX configuration information in case that the preconfigured condition is satisfied.

Advantageous Effects of Invention

According to the disclosure, by reducing the delay required for beam failure detection, in case that a beam failure occurs, a terminal can quickly recover the beam failure.

MODE FOR THE INVENTION

Hereinafter, an operating principle of the disclosure will be described in detail with reference to the accompanying drawings. In the following description, in describing the disclosure, in case that it is determined that a detailed description of a related well-known function or configuration may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the content throughout this specification.

Hereinafter, a term identifying an access node used in the description, a term indicating network entities, a term indicating messages, a term indicating an interface between network objects, a term indicating various types of identification information and the like are exemplified for convenience of description. Accordingly, the disclosure is not limited to the terms described below, and other terms indicating objects having equivalent technical meanings may be used.

Figure 1:
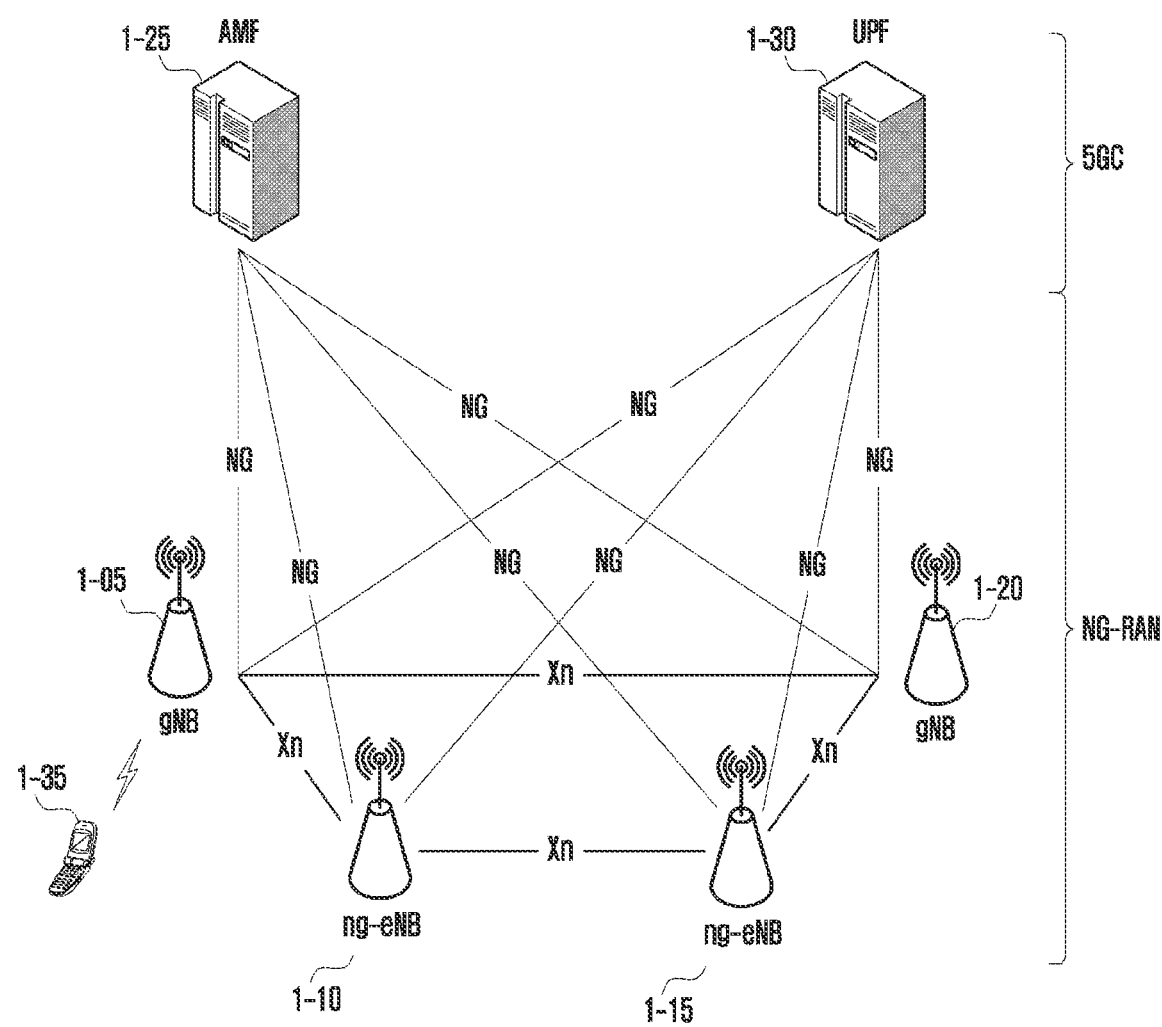
FIG. 1 is a diagram illustrating a structure of an NR system referenced for the description of the disclosure.

Hereinafter, for convenience of description, the disclosure uses terms and names defined in LTE and NR standards, which are the latest standards defined by the 3rd generation partnership project (3GPP) organization among currently existing communication standards. However, the disclosure is not limited by the above terms and names, and may be equally applied to systems conforming to other standards. In particular, the disclosure may be applied to 3GPP NR (1st generation mobile communication standard). FIG. 1 is a diagram illustrating a structure of an NR system referenced for the description of the disclosure. The NR system also has a similar structure.

With reference to FIG. 1, a wireless communication system includes a plurality of base stations 1-05, 1-10, 1-15, and 1-20, an access and mobility management function (AMF) 1-20, and a user plane function (UPF) 1-30. A user equipment (hereinafter, referred to as an UE or terminal) 1-35 accesses an external network through the base stations 1-05, 1-10, 1-15, and 1-20 and the UPF 1-30. The base stations 1-05, 1-10, 1-15, and 1-20 are access nodes of a cellular network and provide wireless access to UEs accessing the network. For example, in order to service users' traffic, the base stations 1-05, 1-10, 1-15, and 1-20 collect and schedule state information such as a buffer status, available transmission power status, and channel status of UEs to support a connection between the UEs and a core network (CN, in particular, a CN of NR is referred to as 5GC). In communication, a user plane (UP) related to actual user data transmission and a control plane (CP) such as connection management may be divided and configured, and in this drawing, gNBs 1-05 and 1-20 uses UP and CP technologies defined in the NR technology, and ng-eNBs 1-10 and 1-15 are connected to 5GC, but use UP and CP technologies defined in LTE technology.

The AMF/SMF 1-25 is a device in charge of various control functions as well as a mobility management function for the UE, and may be connected to a plurality of base stations. The UPF 1-30 is a kind of gateway device that provides data transmission.

The AMF 1-20 may be an apparatus (entity, or node) that performs the AMF. The UPF 1-30 may be an apparatus (entity, or node) that performs the UPF.

Figure 2:
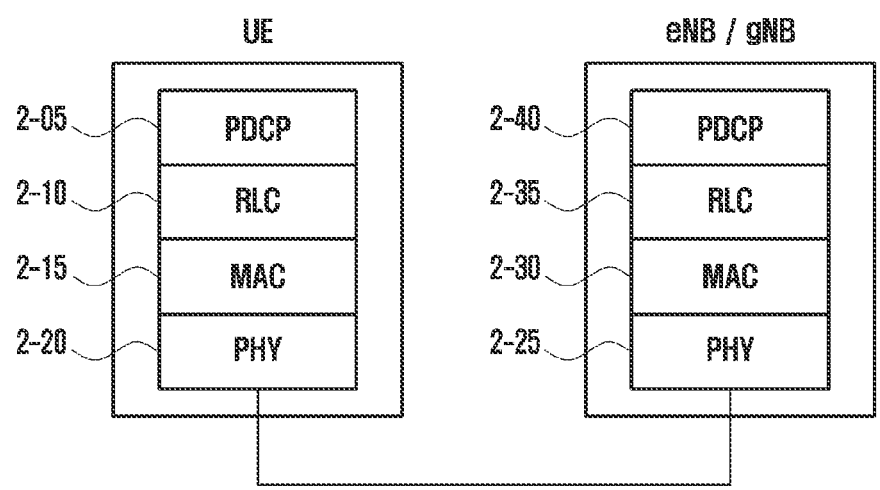
FIG. 2 is a block diagram illustrating a radio protocol structure in LTE and NR systems referenced for the description of the disclosure.

FIG. 2 is a block diagram illustrating a radio protocol structure in LTE and NR systems referenced for the description of the disclosure.

With reference to FIG. 2, radio protocols of LTE and NR systems are configured with packet data convergence protocols (PDCP) 2-05 and 2-40, radio link controls (RLC) 2-10 and 2-35, and medium access controls (MAC) 2-15 and 2-30, respectively in the UE and the eNB/gNB. The PDCPs 2-05 and 2-40 are in charge of operations such as IP header compression/restoration, and radio link controls (hereinafter, referred to as RLC) 2-10 and 2-35 reconfigure a PDCP packet data unit (PDU) in an appropriate size. The MACs 2-15 and 2-30 are connected to several RLC layer devices configured in one UE, and perform operations of multiplexing RLC PDJs into MAC PDUs and demultiplexing RLC PDUs from the MAC PDUs. Physical layers 2-20 and 2-25 perform operations of channel-coding and modulating upper layer data, generating the upper layer data into an OFDM symbol and transmitting the OFDM symbol to a radio channel, or demodulating and channel-decoding an OFDM symbol received through the radio channel to transfer the OFDM symbol to a higher layer. Further, the physical layer uses hybrid ARQ (HARQ) for additional error correction, and the receiving end transmits with 1 bit whether a packet transmitted from the transmitting end is received. This is referred to as HARQ ACK/NACK information. In the case of LTE, downlink HARQ ACK/NACK information on uplink data transmission is transmitted through a physical hybrid-ARQ indicator channel (PHICH) physical channel, and in the case of NR, it is possible to determine whether retransmission is necessary or whether new transmission needs to be performed through scheduling information of the corresponding UE in a physical dedicated control channel (PDCCH), which is a channel for transmitting downlink/uplink resource allocation. This is because asynchronous HARQ is applied in NR. Uplink HARQ ACK/NACK information for downlink data transmission may be transmitted through a physical uplink control channel (PUCCH) or a physical uplink shared channel (PUSCH) physical channel. The PUCCH is generally transmitted in the uplink of a Pcell to be described later, but in case that the base station is supported by the UE, the PUCCH may be additionally transmitted to an SCell to be described later to the corresponding UE, which is referred to as a PUCCH SCell.

Although not illustrated in this drawing, a radio resource control (RRC) layer exists on a PDCP layer of the UE and the base station, and the RRC layer may send and receive access and measurement related configuration control messages for radio resource control.

The PHY layer may be configured with one or a plurality of frequencies/carriers, and technology that simultaneously configures and uses a plurality of frequencies is referred to as carrier aggregation (hereinafter, referred to as CA). CA technology has used only one carrier for communication between the user equipment (or UE) and the base station (E-UTRAN nodeB, eNB), but may dramatically increase a transmission amount by the number of sub-carriers additionally using a primary carrier and one or more sub-carriers. In LTE, a cell in a base station using a primary carrier is referred to as a primary cell or a PCell, and a cell in a base station using a subcarrier is referred to as a secondary cell or a SCell.

Figure 3:
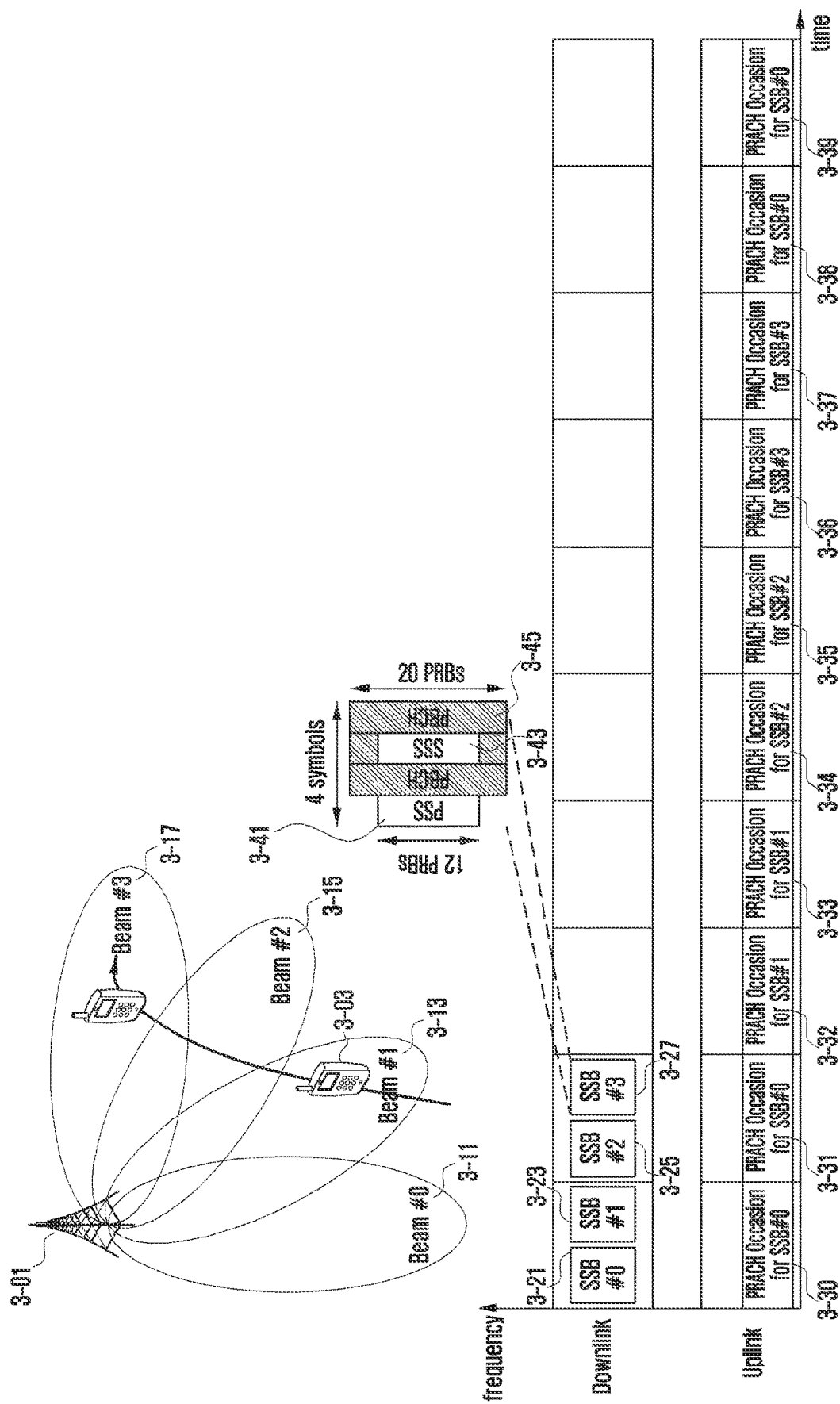
FIG. 3 is a diagram illustrating downlink and uplink channel frame structures upon performing communication based on a beam in an NR system.

FIG. 3 is a diagram illustrating downlink and uplink channel frame structures upon performing communication based on a beam in an NR system.

In FIG. 3, in order to transmit wider coverage or a stronger signal, a base station 3-01 may transmit a signal in the form of a beam (3-11)(3-13)(3-15)(3-17). Accordingly, a UE 3-03 in the cell should transmit and receive data using a specific beam transmitted by the base station (beam #1, 3-13 in this exemplary drawing).

A state of the UE is divided into an idle mode (RRC_IDLE) state and a connected mode (RRC_CONNECTED) state according to whether the UE is connected to the base station.

Accordingly, the base station does not know a location of the UE in the idle mode state.

In case that the UE in the idle mode wants to change to the connected mode state, the UE receives synchronization signal blocks (SSB) 3-21, 3-23, 3-25, and 3-27 transmitted by the base station. The SSB is an SSB signal transmitted periodically according to a cycle configured by the base station, and each SSB may be divided into a primary synchronization signal (PSS) 3-41, a secondary synchronization signal (SSS) 3-43, and a physical broadcast channel (PBCH).

In FIG. 3, a scenario in which the SSB is transmitted for each beam was assumed. For example, it was assumed that the beam #0, 3-11 is used for transmission in case of the SSB #0, 3-21 and that the beam #1, 3-13 is used for transmission in case of the SSB #1, 3-23 and that the beam #2, 3-15 is used for transmission in the case of the SSB #2, 3-25 and that the beam #3, 3-17 is used for transmission in the case of the SSB #3, 3-27. In FIG. 3, a situation was assumed that a UE in an idle mode is positioned in the beam #1, but even in case that a UE in a corrected mode performs random access, the UE may select an SSB received at a time point of performing random access.

Accordingly, in FIG. 3, the UE may receive the SSB #1 transmitted to the beam #1. Upon receiving the SSB #1, the UE may obtain a physical cell identifier (PCI) of the base station through the PSS and SSS, and receive a PBCH, thereby identifying an identifier (e.g., #1) of the currently received SSB and identifying not only a position in which the SSB is currently received within a 10 ms frame, but also what SFN it is in within a system frame number (SFN) having a cycle of 10.24 seconds. Further, a master information block (MIB) is included in the PBCH, and information indicating at which location a system information block type 1 (SIB1) broadcasting configuration information of a more detailed cell may be received is included in the MIB. Upon receiving SIB1, the UE may know the number of total SSBs transmitted by the base station, and identify a location (assuming a scenario allocated every 1 ms in FIG. 3: from 3-30 to 3-39) of the physical random access channel (PRACH) occasion that may perform random access (more precisely, capable of transmitting a preamble, which is a physical signal specially designed to match uplink synchronization) so as to change to the connected mode state.

Further, the UE may know which PRACH occasion among the PRACH occasions is mapped to which SSB index based on the information. For example, in this exemplary drawing, it was assumed that a scenario of allocating every 1 ms, and a scenario in which ½ SSB was allocated per PRACH occasion (e.g., 2 PRACH occasions per SSB) was assumed. Accordingly, there was illustrated a scenario in which two PRACH occasions are allocated for each SSB from the start of a PRACH occasion starting according to an SFN value. For example, (3-30)(3-31) are a scenario allocated for the SSB #0, and (3-32)(3-33) are a scenario allocated for the SSB #1. After being configured for all SSBs, a PRACH occasion may be allocated again for the first SSB (3-38)(3-39).

Accordingly, the UE may recognize a location of PRACH occasions 3-32 and 3-33 for the SSB #1, and accordingly, the UE may transmit a random access preamble to the fastest PRACH occasion at a current time point among the PRACH occasions 3-32 and 3-33 corresponding to the SSB #1 (e.g., 3-32). Because the base station received a preamble in the PRACH occasion of 3-32, it can be seen the fact that the corresponding UE selected SSB #1 to transmit the preamble, and accordingly, when the subsequent random access is performed, data may be transmitted and received through the corresponding beam.

Even when the UE in a connected state moves from a current (source) base station to a target base station due to reasons such as handover, the UE may perform random access in the target base station, and perform an operation of transmitting random access by selecting the SSB, as described above. Further, during handover, a handover command is transmitted to the UE to move from the source base station to the target base station, and in this case, in the message, the corresponding UE dedicated random access preamble identifier for each SSB of the target base station may be assigned to use upon performing random access in the target base station. In this case, the base station may not allocate a dedicated random access preamble identifier to all beams (according to a Current location of the UE, and the like). Accordingly, a dedicated random access preamble may not be allocated to some SSBs (e.g., a dedicated random access preamble is allocated only to beams #2 and #3). In case that a dedicated random access preamble is not allocated to the SSB selected by the UE for preamble transmission, random access may be performed by randomly selecting a contention-based random access preamble. For example, in the example of FIG. 3, after the UE performed random access by being first positioned in the beam #1, but failed, a scenario in which the UE is positioned in the beam #3 and transmits the dedicated preamble upon transmitting again the random access preamble is possible. For example, in case that preamble retransmission occurs even within one random access procedure, a contention-based random access procedure and a non-contention-based random access procedure may be mixed according to whether a dedicated random access preamble is allocated to the selected SSB for each preamble transmission.

Figure 4:
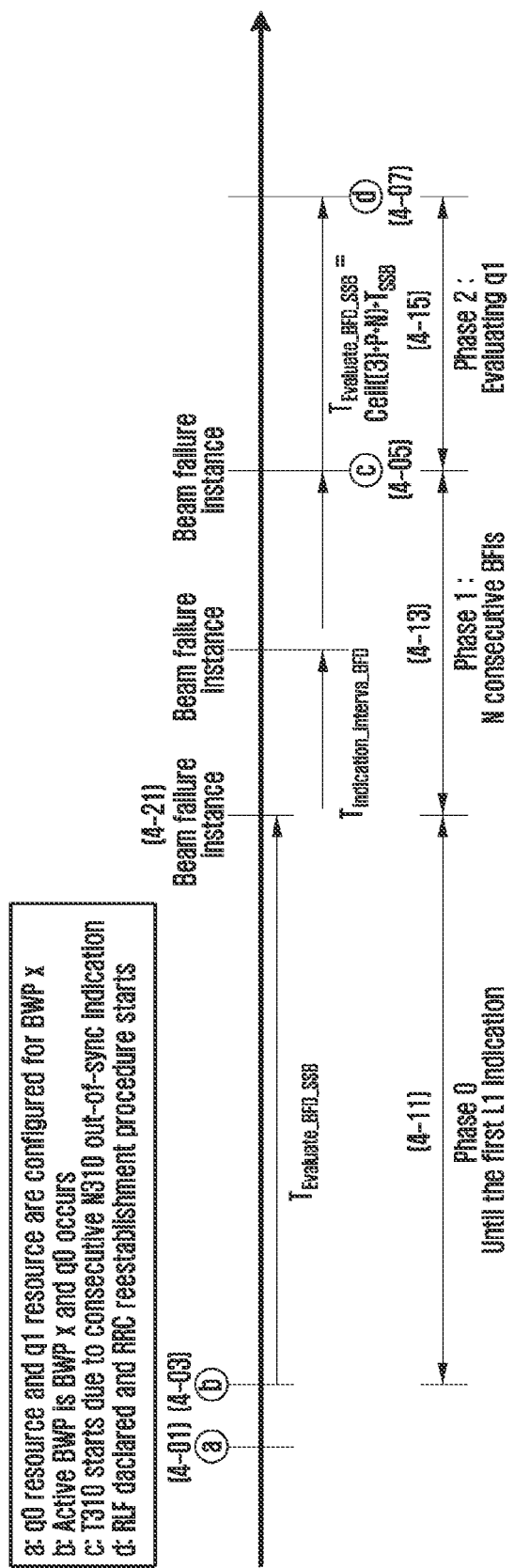
FIG. 4 is a diagram illustrating a procedure for a terminal to detect beam failure in an NR system.

FIG. 4 is a diagram illustrating a procedure for a UE to detect beam failure in an NR system.

According to the procedure of FIG. 3, the UE and the base station select a beam to perform data communication and transmit and receive data through the beam. However, a case that the currently used beam may no longer be used due to reasons such as a sudden movement of the UE or a movement to a shaded area is referred to as beam failure. A procedure for detecting the beam failure is referred to as beam failure detection (BFD). FIG. 4 is a diagram schematically illustrating a beam failure detection procedure.

First, the UE receives, from the base station, information on a reference signal resource transmitted by the base station for beam failure detection for each bandwidth part (BWP) configured to the UE (4-01). The UE actually operates only in one BWP. For example, when a bandwidth of the base station is 100 MHz, two BWPs may be configured to the UE, one BWP may be configured to 20 MHz, the other BWP may be configured to 80 MHz, and BFD measurement resources may be configured for each BWP. The UE that has received the configuration information starts to measure the BFD measurement resource currently configured to the BWP (4-03).

For example, the UE may receive a signal from at least one BFD measurement resource configured by the base station. In this case, in case that all strength of the signal received by the UE from the above configured all BFD measurement resource(s) is lower than a predetermined threshold, the UE may determine that a beam failure is detected.

Thereafter, a PHY layer of the UE should be able to notify a MAC layer of the UE whether the beam has failed by completing first measurement within a predetermined time, and the predetermined time is referred to as $T_{Evaluate\_BFD\_SSB}$. NR is classified into FR1 or FR2 according to an operating frequency, as illustrated in Table 1.

TABLE 1

| Frequency range designation | Corresponding frequency range |
|---|---|
| FR1 | 410 MHz-7125 MHz |
| FR2 | 24250 MHz-52600 MHz |

In this case, the $T_{Evaluate\_BFD\_SSB}$ has different requirements, as illustrated in Tables 2 and 3 according to whether it operates in FR1 or FR2.

TABLE 2

Evaluation period $T_{Evaluate\_BFD\_SSB}$ for FR1

| Configuration | $T_{Evaluate\_BFD\_SSB}$ (ms) |
|---|---|
| no DRX | max([50], cell(5*P)*$T_{SBB}$) |
| DRX cycle ≤320 ms | max([50], cell(7.5*P)* max($T_{DRX}$, $T_{SSB}$)) |
| DRX cycle >320 ms | cell(5*P)*$T_{DRX}$ |

Note:
$T_{SBB}$ is the periodicity of SSB in the set $\bar{q}_0$. $T_{DRX}$ is the DRX cycle length.

TABLE 3

Evaluation period $T_{Evaluate\_BFD\_out}$ for FR2

| Configuration | $T_{Evaluate\_BFD\_SSB}$ (ms) |
|---|---|
| no DRX | max([50], cell(5*P*N)*$T_{SBB}$) |
| DRX cycle ≤320 ms | max([50], cell(7.5*P*N)* max($T_{DRX}$, $T_{SSB}$)) |
| DRX cycle >320 ms | cell(5*P*N)*$T_{DRX}$ |

Note:
$T_{SBB}$ is the periodicity of SSB in the set $\bar{q}_0$. $T_{DRX}$ is the DRX cycle length.

In the above equation, discontinuous reception (DRX) refers to technology for monitoring scheduling information (PDCCH) discontinuously transmitted to a downlink according to a value configured by the base station in order to reduce power consumption of the UE. The DRX will be described in detail with reference to FIG. 5. The base station may configure the DRX in the UE.

In the above equation, it can be seen that $T_{Evaluate\_BFD\_SSB}$ also increases proportionally when a cycle of DRX becomes longer, and according to an N value corresponding to the number of reception beams and a DRX cycle length and a P value determined according to a measurement interval, the $T_{Evaluate\_BFD\_SSB}$ may take several seconds to several tens of seconds. For convenience, the above procedure is referred to as normal BFD measurement.

To improve this, fast BFD measurement may be considered. The fast BFD may mean performing the BFD and transferring the result of the BFD execution from a physical layer of the UE to a medium access control (MAC) layer of the UE within a calculated first time without considering the DRX cycle.

For example, fast BFD is a method of generating a measurement result by measuring more frequently the BFD measurement resource without considering the DRX cycle for a predetermined period. For example, fast BFD is a method of generating a measurement result by continuously performing measurement during a (no DRX) period when DRX is not configured in the above tables (Tables 2 and 3). Fast BFD is a method of measuring BFD resources and generating a measurement result in consideration of a DRX cycle, as in normal BFD after the predetermined period. An example of the predetermined period is a period from the start of the BFD measurement to the generation of the first measurement result, and may be the aforementioned $T_{Evaluate\_BFD\_SSB}$.

When a time point for starting BFD measurement is described in more detail, it may be a time point at which the BFD measurement resource is initially configured, as in the above example or it may be a time point at which the BFD measurement resource is configured to the switched BWP as BWP switching occurs. For example, the UE may receive an RRC message for configuring the BFD measurement resource from the base station. In case that the BFD measurement resource is initially configured based on the RRC message, the UE may perform fast BFD. The RRCE message may include indication information for indicating to perform the fast BFD.

Alternatively, a time point that starts the BFD measurement may be a time point at which an SCell is activated or a time point at which a PCell is changed (i.e., handover). In case of the SCell activation and handover, the BFD resource configured in a first activated BWP configured to a firstActiveDownlinkBWP-Id of the corresponding cell in the RRC message may be measured. For example, the UE may receive a MAC control element (CE) for activating the SCell. The UE may activate the SCell based on the received MAC CE, and perform fast BFD in the activated SCell.

The fast BFD procedure may always be used when the UE supports it. Alternatively, a scenario of using the fast BFD procedure only in case that the base station transmits a separate indicator (e.g., fastBFD-indication) so as to explicitly instruct the use of the fast BFD procedure may be considered.

Further, a scenario of using a fast BFD procedure only in case that a specific condition is satisfied instead of using fastBFD-indication only in case that the UE supports a fast BFD procedure may be considered. As an example of the specific condition, a case that an operating frequency is FR2, a case that the DRX cycle exceeds a specific length of the base station, or a case that an operating frequency belongs to FR2 and that the DRX cycle exceeds a specific length may be considered. In other scenarios, the UE may use the normal BFD procedure.

After the $T_{Evaluate\_BFD\_SSB}$ time point, a PHY layer of the UE may perform measurement at every notification interval $T_{indication\_interval\_BFD}$ and notify a MAC layer of the UE. In this case, in case that the SSB is used for BFD measurement, and in case that DRX is not configured, the $T_{indication\_interval\_BFD}$ has a max(2 ms, $T_{SSB-RS,M}$) value, and in case that DRX is configured, and in case that the DRX cycle is 320 ms or less, the $T_{indication\_interval\_BFD}$ has max (1.5*DRX cycle, 1.5*$T_{SSB-RS,M}$), and in case that the DRX cycle exceeds 320 ms, the $T_{indication\_interval\_BFD}$ has a DRX cycle.

For every $T_{indication\_interval\_BFD}$, the MAC layer may receive a beam failure instance indication from the PHY layer. In case that a state of the beam is good, the MAC layer does not receive a beam failure instance indication (e.g., in case that a signal quality of the beam is greater than $Q_{out\_LR}$). The MAC layer may declare beam failure detection and start a beam failure recovery procedure in case that the MAC layer receives the continuously configured number of beam failure instance indications within the configured time according to information received from the RRC layer in the step (4-01). The beam failure recovery procedure is similar to the above-described random access procedure, and according to the configuration of the base station, a dedicated preamble that may be used for beam failure recovery may be configured, and in case that the corresponding preamble may be used, a non-contention-based random access procedure is used, and in other cases, contention-based random access is used to notify information on a beam currently being used by the UE.

Figure 5:
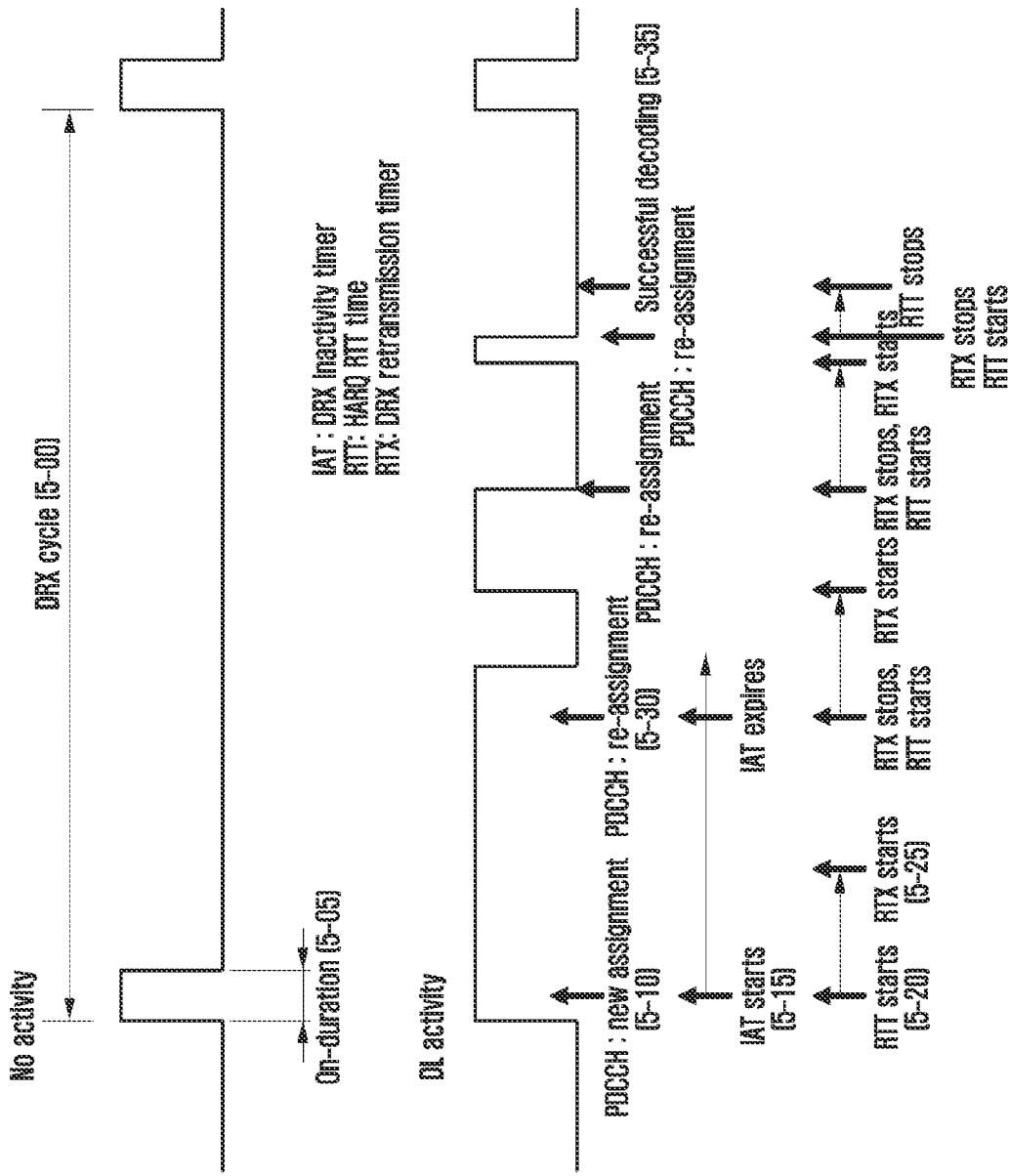
FIG. 5 is a diagram illustrating an operation of discontinuous reception (hereinafter, referred to as DRX) configured to a terminal in order to reduce power consumption of the terminal.

FIG. 5 is a diagram illustrating an operation of discontinuous reception (hereinafter, referred to as DRX) configured to a UE in order to reduce power consumption of the UE.

DRX is technology that monitors only some PDCCHs according to configuration information instead of monitoring all physical downlink control channels (hereinafter, referred to as a PDCCH) in order to obtain scheduling information according to a configuration of the base station so as to minimize power consumption of the UE. A basic DRX operation has a DRX cycle 5-00, and the UE monitors a PDCCH only for an onDuration 5-05 time. In a connected mode, two values of long DRX and short DRX are configured to a DRX cycle. In a general case, a long DRX cycle is applied, and if necessary, the base station may additionally configure a short DRX cycle. When both the long DRX cycle and the short DRX cycle are configured, the UE may repeat from the short DRX cycle while starting a drxShort-CycleTimer. In case that there is no new traffic until the drxShortCycleTimer expires, the UE may change from a short DRX cycle to a long DRX cycle. When scheduling information on a new packet is received by the PDCCH during an on-duration (5-05) time (5-10), the UE may start an InactivityTimer 5-15. The UE may maintain an active state during the InactivityTimer. In other words, the UE may continue PDCCH monitoring. Further, the UE may start a HARQ RTT timer 5-20. The HARQ RTT timer is applied to prevent the UE from unnecessarily monitoring the PDCCH during a HARQ round trip time (RTT), and during the timer operation time, the UE does not need to perform PDCCH monitoring. While the InactivityTimer and the HARQ RTT timer simultaneously operate, the UE may continue PDCCH monitoring based on the InactivityTimer. When the HARQ RTT timer expires, a DRX retransmission timer 5-25 may be started. While the DRX retransmission timer operates, the UE should perform PDCCI monitoring. In general, during a DRX retransmission timer operation time, scheduling information for HARQ retransmission may be received (5-30). Upon receiving the scheduling information, the UE may immediately stop the DRX retransmission timer and start the HARQ RTT timer again. The above operation may be continued until the packet is successfully received (5-35). Further, while the UE operates an on-duration or InactivityTimer, in case that the base station no longer has data to send to the corresponding UE, the base station may transmit a DRX command MAC CE message. Upon receiving the DRX command MAC CE message, the UE may stop both the operating on-duration timer and InactivityTimer. In case that short DRX is configured, the UE may preferentially use a short DRX cycle, and in case that only long DRX is configured, the UE may use a long DRX cycle.

Figure 6:
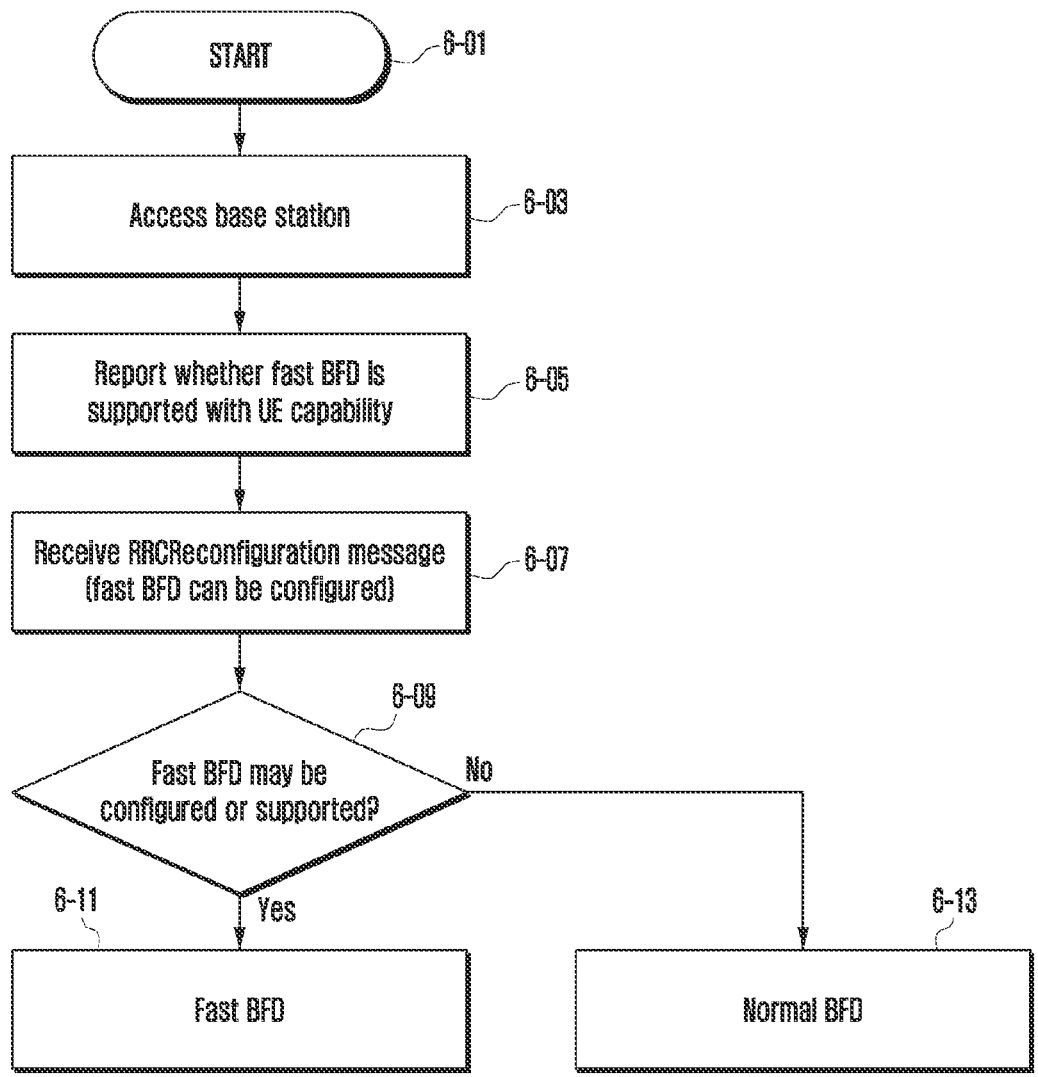
FIG. 6 is a flowchart illustrating an operation sequence of a terminal when using fast beam failure detection.

FIG. 6 is a diagram illustrating an operation sequence of a UE when using fast beam failure detection.

When uplink data is generated or a paging message is received from the base station, the UE in an idle state (RRC_IDLE) may access the currently camping base station (or cell) (6-03). To this end, the UE performs the above-mentioned random access to the corresponding base station, transmits an RRCRequest message of an RRC layer to the base station during a random access procedure, receives an RRCSetup message from the base station accordingly, and transmits an RRCSetupComplete message back to the base station to complete the access procedure. Upon successfully receiving the RRCSetup message, the UE is changed to the connected state (RRC_CONNECTED).

In case that the UE has never accessed an operator's network before or in case that there is no capability information of the UE in a core network due to a movement, the base station may instruct the UE to report capability information of the UE using an UECapabilityEnquiry message of the RRC layer. Accordingly, the UE may report capability information thereof to the base station using a UECapabilityInformation message of the RRC layer. In this case, the UE may transmit information on whether fast BFD is supported to the base station. For example, the UE may include a bit (e.g., fastBFD-support) indicating whether the above-described fast BFD procedure is supported and transmit the information to the base station (6-05).

Thereafter, the UE receives an RRCReconfiguration message of the RRC layer from the base station to receive various types of configuration information (6-07). The various types of configuration information may include a drx-Config field including DRX configuration information and a radiolinkMonitoringConfig field including parameters for beam failure detection and recovery. As described above, the radioLinkMonitoringConfig field may include an indicator explicitly indicating whether the base station allows fast BFD. Alternatively, even if the radioLinkMonitoringConfig field does not include an indicator, in case that the UE supports fast BFD, the UE may perform a fast BFD operation.

According to the received RRC configuration information, the UE may start BFD measurement. The starting time point may be a time point at which the BFD measurement resource is initially configured with the RRC message, as described above. Accordingly, the UE may start BFD measurement for the activated serving cells. Alternatively, after the BFD measurement resource is configured in advance by the RRC, BWP switching occurs, and thus it may be a time point at which the BFD measurement resource is configured to the switched BWP or may be an activated time point of the SCell configured through a MAC control element (CE), which is a control message of the MAC layer. Further, the RRCReconfiguration message may be used even in case of handover (PCell change), and in this case, it may be a time point at which handover to the target base station is completed. In case of the SCell activation and handover, the UE may measure a BFD resource configured to the first activated BWP configured to a firstActiveDownlinkBWP-Id of the corresponding cell in the RRC message.

As described above, when starting BFD measurement, the UE may determine whether to use fast BFD or normal BFD (6-09). More specifically, when the UE supports a fast BFD procedure, in case that the base station explicitly instructs (configures) the use, as in step (6-07), the UE may use fast BFD, and even if there is no separate explicit indicator, a scenario of using the fast BFD procedure only in case that a specific condition is satisfied may be considered. Examples of the specific condition may include at least one of a case that an operating frequency is FR2 or a case that a DRX cycle exceeds a specific length. Alternatively, in case that the UE supports the fast BFD procedure, a scenario of always using the fast BFD procedure may be considered. Accordingly, in case that fast BFD use is configured or conditions are satisfied or supported, the UE may use the above-described fast BFD procedure (6-11), otherwise, the UE may use the above-described normal BFD procedure (6-13).

Accordingly, after the initial beam failure instance, a PHY layer of the UE may perform measurement at every notification interval $T_{indication\_interval\_BFD}$ and notify a MAC layer of the UE. In this case, when the SSB is used for BFD measurement, the $T_{indication\_interval\_BFD}$ has a max (2 ms, $T_{SSB-RS,M}$) value in case that DRX is not configured, and in case that DRX is configured, and in case that the DRX cycle is 320 ms or less, the $T_{indication\_interval\_BFD}$ has max (1.5*DRX cycle, 1.5*$T_{SSB-RS,M}$), and in case that the DRX cycle exceeds 320 ms, the $T_{indication\_interval\_BFD}$ has a DRX cycle.

For every $T_{indication\_interval\_BFD}$, the MAC layer of the UE may receive a beam failure instance indication from the PHY layer. In case that a state of the beam is good (e.g., in case that a signal quality of the beam is greater than $Q_{out\_LR}$), the MAC layer of the UE does not receive a beam failure instance indication. In case of receiving the continuously configured number of beam failure instance indications within a configured time according to information received from the RRC layer in the above step, the MAC layer may declare beam failure detection and start a beam failure recovery procedure.

The beam failure recovery procedure is similar to the above-described random access procedure, and may receive a configuration of a dedicated preamble that may use upon beam failure recovery according to the configuration of the base station. In case that the corresponding preamble may be used, the MAC layer may use a non-contention-based random access procedure, and in other cases, the MAC layer may use contention-based random access to notify information on a beam currently being used by the UE.

Figure 7:
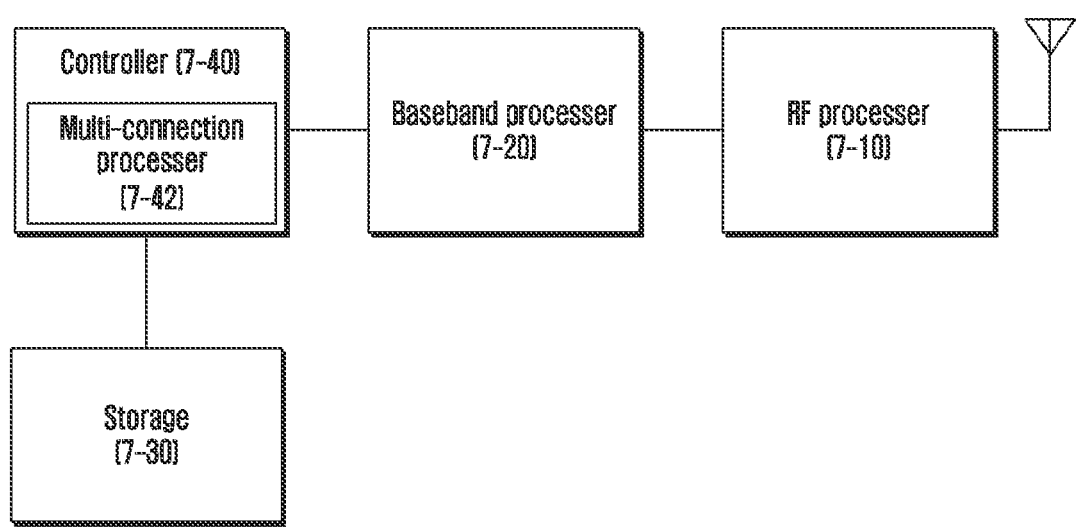
FIG. 7 illustrates a block configuration of a terminal in a wireless communication system according to an embodiment of the disclosure.

FIG. 7 illustrates a block configuration of a UE in a wireless communication system according to an embodiment of the disclosure.

With reference to FIG. 7, the UE may include a radio frequency (RF) processor 7-10, a baseband processor 7-20, a storage 7-30, and a controller 7-40.

The RF processor 7-10 performs a function for transmitting and receiving a signal through a wireless channel, such as band conversion and amplification of the signal. For example, the RF processor 7-10 may up-convert a baseband signal provided from the baseband processor 7-20 into an RF band signal, transmit the signal through an antenna, and down-convert the RF band signal received through the antenna to a baseband signal. For example, the RF processor 7-10 may include a transmission filter, a reception filter, an amplifier, a mixer, an oscillator, a digital to analog converter (DAC), an analog to digital converter (ADC), and the like. Although only one antenna is illustrated in FIG. 7, the UE may include a plurality of antennas. Further, the RF processor 7-10 may include a plurality of RF chains. Furthermore, the RF processor 7-10 may perform beamforming. For the beamforming, the RF processor 7-10 may adjust a phase and magnitude of each of signals transmitted and received through a plurality of antennas or antenna elements.

The baseband processor 7-20 performs a function of converting between a baseband signal and a bit string according to a physical layer standard of the system. For example, in case of transmitting data, the baseband processor 7-20 may encode and modulate a transmitted bit string to generate complex symbols. Further, when receiving data, by demodulating and decoding the baseband signal provided from the RF processor 7-10, the baseband processor 7-20 recovers the received bit string. For example, in case of transmitting data according to an orthogonal frequency division multiplexing (OFDM) scheme, the baseband processor 7-20 may encode and modulate a transmission bit string to generate complex symbols, map complex symbols to subcarriers, and then configure OFDM symbols through inverse fast Fourier transform (IFFT) operation and cyclic prefix (CP) insertion. Further, in case of receiving data, the baseband processor 7-20 divides the baseband signal provided from the RF processor 7-10 into OFDM symbol units, recovers signals mapped to subcarriers through a fast Fourier transform (FFT) operation, and then recovers the received bit string through demodulation and decoding.

The baseband processor 7-20 and the RF processor 7-10 transmit and receive signals, as described above. Accordingly, the baseband processor 7-20 and the RF processor 7-10 may be referred to as a transmitter, a receiver, a transceiver, or a communication unit.

Furthermore, at least one of the baseband processor 7-20 or the RF processor 7-10 may include a plurality of communication modules so as to support a plurality of different wireless access technologies. Further, at least one of the baseband processor 7-20 or the RF processor 7-10 may include different communication modules so as to process signals of different frequency bands. For example, the different wireless access technologies may include a wireless LAN (e.g., IEEE 802.11), a cellular network (e.g., LTE), and the like. Further, the different frequency bands may include a super high frequency (SHF) (e.g., 2.5 GHz, 5 GHz) band and a millimeter wave (e.g., 60 GHz) band.

The storage 7-30 stores data such as a basic program, an application program, and configuration information for an operation of the UE. In particular, the storage 7-30 may store information related to a wireless LAN node performing wireless communication using wireless LAN access technology. The storage 7-30 provides stored data according to the request of the controller 7-40.

The controller 7-40 controls overall operations of the UE. For example, the controller 7-40 may transmit and receive signals through the baseband processor 7-20 and the RF processor 7-10. Further, the controller 7-40 may write and read data in the storage 7-40. To this end, the controller 7-40 may include at least one processor. For example, the controller 7-40 may include a communication processor (CP) that controls for communication and an application processor (AP) that controls an upper layer such as an application program. According to an embodiment of the disclosure, the controller 7-40 includes a multi-connection processer 7-42 that performs processing for operating in a multi-connection mode. For example, the controller 7-40 may control the UE to perform the procedure illustrated in the operation of the UE illustrated in FIG. 5.

The controller 7-40 according to an embodiment of the disclosure detects a beam failure according to the above-described condition, so that even in case that DRX is configured, the controller 7-40 can quickly detect a beam failure and quickly recover the beam failure. Methods according to the embodiments described in the claims or specifications of the disclosure may be implemented in the form of hardware, software, or a combination of hardware and software.

In case of being implemented in software, a computer readable storage medium storing one or more programs (software modules) may be provided. One or more programs stored in the computer readable storage medium are configured for execution by one or more processors in an electronic device. The one or more programs include instructions for causing an electronic device to execute methods according to embodiments described in a claim or specification of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), another form of optical storage device, or a magnetic cassette. Alternatively, the programs may be stored in a memory configured with a combination of some or all thereof. Further, each configuration memory may be included in the plural.

Further, the program may be stored in an attachable storage device that may access through a communication network such as the Internet, Intranet, local area network (LAN), wide LAN (WLAN), or storage area Network (SAN), or a communication network configured with a combination thereof. Such a storage device may access a device implementing an embodiment of the disclosure through an external port. Further, a separate storage device on a communication network may access a device implementing the embodiment of the disclosure.

In the specific embodiments of the disclosure described above, elements included in the disclosure were expressed in the singular or plural according to the presented specific embodiments. However, the singular or plural expression is appropriately selected for a situation presented for convenience of description, and the disclosure is not limited to the singular or plural element, and even if a component is represented in the plural, it may be configured with the singular, or even if a component is represented in the singular, it may be configured with the plural.

In the detailed description of the disclosure, although specific embodiments have been described, various modifications are possible without departing from the scope of the disclosure. Therefore, the scope of the disclosure should not be limited to the described embodiments and should be defined by the claims described below as well as equivalents to the claims.

The invention claimed is:

1. A method of controlling a terminal in a wireless communication system, the method comprising:
    receiving, from a base station, a message including discontinuous reception (DRX) configuration information;
    performing beam failure detection (BFD) in at least one resource configured by the base station;
    identifying whether a preconfigured condition is satisfied; and
    performing fast BFD that transfers a result of the performed BFD without considering a DRX cycle included in the DRX configuration information in case that the preconfigured condition is satisfied.

2. The method of claim 1, wherein the identifying comprises identifying that the preconfigured condition is satisfied in case that radio link monitoring configuration information on at least one activated serving cell is configured by the base station.

3. The method of claim 1, wherein the identifying comprises identifying that the preconfigured condition is satisfied in case that an activation command for activating a secondary cell in which radio link monitoring configuration information is configured is received.

4. The method of claim 1, wherein the identifying comprises identifying that the preconfigured condition is satisfied in case of performing handover to another primary cell in which radio link monitoring configuration information is configured.

5. The method of claim 1, further comprising transmitting, to the base station, a message including capability information indicating that the terminal supports the fast BFD.

6. The method of claim 1, wherein performing the fast BFD comprises:
    performing the BFD, and transferring the result of the performed BFD from a physical layer of the terminal to a medium access control (MAC) layer of the terminal within a calculated first time without considering the DRX cycle.

7. The method of claim 1, wherein the identifying comprises identifying that the predetermined condition is satisfied in case that at least one of a case of receiving indication information indicating activation of the fast BFD from the base station, a case that the terminal performs wireless communication in a frequency band within a specific range, or a case that a length of the DRX cycle is greater than or equal to a threshold is identified.

8. A terminal in a wireless communication system, the terminal comprising:
    a transceiver; and
    a controller configured to:
        receive, from a base station via the transceiver, a message including discontinuous reception (DRX) configuration information,
        perform beam failure detection (BFD) in at least one resource configured by the base station,
        identify whether a preconfigured condition is satisfied, and
        perform fast BFD that transfers a result of the performed BFD without considering a DRX cycle included in the DRX configuration information in case that the preconfigured condition is satisfied.

9. The terminal of claim 8, wherein in case that radio link monitoring configuration information on at least one activated serving cell is configured by the base station, the controller is configured to identify that the preconfigured condition is satisfied.

10. The terminal of claim 8, wherein in case that an activation command for activating a secondary cell in which radio link monitoring configuration information is configured is received, the controller is configured to identify that the preconfigured condition is satisfied.

11. The terminal of claim 8, wherein in case of performing handover to another primary cell in which radio link monitoring configuration information is configured, the controller is configured to identify that the preconfigured condition is satisfied.

12. The terminal of claim 8, wherein the controller is configured to control the transceiver to transmit, to the base station, a message including capability information indicating that the terminal supports the fast BFD.

13. The terminal of claim 8, wherein the controller is further configured to:
   perform the BFD, and transfer the result of the performed BFD from a physical layer of the terminal to a medium access control (MAC) layer of the terminal within a calculated first time without considering the DRX cycle.

14. The terminal of claim 8, wherein in case that at least one of a case of receiving indication information indicating activation of the fast BFD from the base station, a case that the terminal performs wireless communication in a frequency band within a specific range, or a case that a length of the DRX cycle is greater than or equal to a threshold is identified, the controller is configured to identify that the preconfigured condition is satisfied.

* * * * *